United States Patent
Ohtomo et al.

(10) Patent No.: US 7,474,388 B2
(45) Date of Patent: Jan. 6, 2009

(54) DISTANCE MEASURING DEVICE

(75) Inventors: Fumio Ohtomo, Itabashi-ku (JP); Naoto Miki, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 11/666,669

(22) PCT Filed: May 10, 2006

(86) PCT No.: PCT/JP2006/009772

§ 371 (c)(1),
(2), (4) Date: Apr. 30, 2007

(87) PCT Pub. No.: WO2006/132060

PCT Pub. Date: Dec. 14, 2006

(65) Prior Publication Data
US 2007/0263202 A1    Nov. 15, 2007

(30) Foreign Application Priority Data
Jun. 6, 2005    (JP) ............................. 2005-165185

(51) Int. Cl.
*G01C 3/08* (2006.01)
(52) U.S. Cl. ................... 356/4.07; 356/4.01; 356/4.02; 356/4.1
(58) Field of Classification Search ............... 356/4.07, 356/3.01–3.15, 4.01–4.1, 5.01–5.15, 6–22
See application file for complete search history.

(56) References Cited
U.S. PATENT DOCUMENTS 5,949,531 A * 9/1999 Ehbets et al. .............. 356/5.01
6,075,586 A * 6/2000 Ohtomo et al. ............ 356/4.08
6,246,468 B1 * 6/2001 Dimsdale .................. 356/4.02
6,727,985 B2 * 4/2004 Giger ....................... 356/5.15
7,110,102 B2 9/2006 Ohtomo et al. ........... 356/141.4

FOREIGN PATENT DOCUMENTS

| DE | 43 41 080 | 2/1995 |
|---|---|---|
| JP | 60-149985 | 8/1985 |
| JP | 4-177195 | 6/1992 |
| JP | 4-313013 | 11/1992 |
| JP | 6-214027 | 8/1994 |
| JP | 7-191142 | 7/1995 |
| JP | 2694647 | 9/1997 |
| JP | 10-20035 | 1/1998 |
| JP | 10-213661 | 8/1998 |
| JP | 2004-212058 | 7/2004 |
| JP | 2005-221336 | 8/2005 |

* cited by examiner

*Primary Examiner*—Thomas H Tarcza
*Assistant Examiner*—Luke D Ratcliffe
(74) *Attorney, Agent, or Firm*—Nields & Lemack

(57) ABSTRACT

The present invention provides a distance measuring device, which comprises a light projecting unit for projecting a distance measuring light (22) to an object to be measured, a reference reflection unit (55) provided relatively movable and arranged at a known position so as to traverse the projected distance measuring light, a photodetection unit (7) for receiving a reflection light from the object to be measured as a reflected distance measuring light (22') and a reflection light from said reference reflection unit as an internal reference light (22"), and a control arithmetic unit (15) for calculating a distance to the object to be measured based on a photodetection signal relating to the reflected distance measuring light and based on a photodetection signal relating to the internal reference light.

9 Claims, 6 Drawing Sheets

| ROTATION ANGLE θ | 0 | 15 | 30 | ······ |
|---|---|---|---|---|
| ERROR R | $R_1$ | $R_2$ | $R_3$ | ······ |

DISTANCE MEASURING DEVICE

FIELD OF THE INVENTION

The present invention relates to a distance measuring device for measuring a distance by projecting a laser beam to an object to be measured and by receiving a reflection light from the object to be measured.

BACKGROUND ART

As a distance measuring device, a light wave distance measuring device is known. In the light wave distance measuring device, a laser beam is projected to an object to be measured and a distance to the object to be measured is determined by using a reflection light from the object to be measured.

In the light wave distance measuring device known in the past, intensity of the laser beam is modulated at a fixed frequency, and the laser beam is projected as a distance measuring light. A reflected distance measuring light reflected by the object to be measured is received. A phase of intensity modulation of the reflected distance measuring light thus received is compared with a phase of intensity modulation of an internal reference light obtained on a reference optical path formed within the distance measuring device, and a distance to the object to be measured is determined from the phase difference.

The distance measurement in the distance measuring device as described above is based on the phase difference, which is changed depending on the measured distance. The phase difference $\Delta\phi$ is expressed by the following equation 1:

$$\Delta\phi = 4\pi f D/C \quad \text{(Equation 1)}$$

where $\Delta\phi$ represents phase difference between the internal reference light and the reflected distance measuring light, D represents a measured distance, f represents modulation frequency, and C is light velocity.

The measured distance D can be determined by measuring the phase difference $\Delta\phi$. Because the length of optical path for reference is already known, an accurate distance can be determined through correction of the measured distance by internal reference light optical path.

Also, in the distance measurement, drift of detection circuit or the like within the distance measuring device exerts influence and causes measurement error. By comparing the phase of the internal reference light with the phase of the reflected distance measuring light, the influence of the drift of the detection circuit or the like can be offset, and accurate distance can be calculated.

Next, description will be given on general features of a conventional type distance measuring device referring to FIG. 7.

A light emitting element 1 such as a laser diode emits a laser beam, and intensity of the laser beam is modulated at a predetermined frequency by means of a light emission driving circuit 12. The laser beam is split to a distance measuring light 3 and an internal reference light 4 by a half-mirror 2. The distance measuring light 3 transmits the half-mirror 2, and then the distance measuring light 3 is projected to an object 6 to be measured, e.g. a reflection mirror such as a corner cube, through an objective lens 5. A reflected distance measuring light 3' reflected by the object 6 to be measured is received by a photodetection element 7 such as a photo-diode through the objective lens 5 and a half-mirror 8.

The internal reference light 4 is reflected by the half-mirror 2 and the internal reference light 4 is reflected further by the half-mirror 8 on the optical path of the reflected distance measuring light 3' and the internal reference light 4 is received by the photodetection element 7. A photodetection signal of the photodetection element 7 is inputted to a photodetection circuit 13, and the photodetection circuit 13 processes the signal inputted from the photodetection element 7 for calculating a measured distance.

An optical path switcher 9 is provided, which stretches over the optical path of the distance measuring light 3 and the optical path of the internal reference light 4. And a light amount adjuster 11 is provided on the optical path of the reflected distance measuring light 3'. The optical path switcher 9 selectively cuts off one of the optical paths of the distance measuring light 3 and of the internal reference light 4, and allows the other of the optical paths of these lights to pass. At the photodetection element 7, the reflected distance measuring light 3' and the internal reference light 4 are received alternately.

As described above, the distance measuring light 3 with intensity modulation is used, and distance is calculated by obtaining phase difference between the internal reference light 4 and the reflected distance measuring light 3' obtained from the distance measuring light 3. Thereby the difference of the photodetection light amount between the reflected distance measuring light 3' and the internal reference light 4 exerts influence on the accuracy of the distance measurement. Therefore the light amount adjuster 11 is provided. The light amount adjuster 11 comprises an amplitude filter with density continuously changing. By rotating the amplitude filter, the photodetection light amount of the reflected distance measuring light 3' can be adjusted to a constant level. By the light amount adjuster 11, it is so designed that the photodetection light amount of the internal reference light 4 received by the photodetection element 7 is equal to the photodetection light amount of the reflected distance measuring light 3' received by the photodetection element 7 even when the reflected light amount is changed depending on the distance to the object 6 to be measured.

Optical path switching by the optical path switcher 9 and the light amount adjustment by the light amount adjuster 11 are controlled by the driving circuit 14.

The control arithmetic unit 15 controls the light emission driving circuit 12 so that the laser beam emitted from the light emitting element 1 has an intensity modulation at a predetermined frequency, and controls the timing by optical path switching by the optical path switcher 9 which is driven by the driving circuit 14. Further, from the photodetection signal of the photodetection element 7, the control arithmetic unit 15 sends out a control signal to the driving circuit 14 to equalize light amount of the reflected distance measuring light 3' to light amount of the internal reference light 4.

The photodetection circuit 13 performs signal processing such as amplifying and A/D conversion on the signal from the photodetection element 7 and also performs processing such as obtaining phase difference between modulated frequency of the internal reference light 4 and modulated frequency of the reflected distance measuring light 3', and the result is sent out to the control arithmetic unit 15. Based on the phase difference sent out from the photodetection circuit 13, the control arithmetic unit 15 calculates a distance to the object 6 to be measured by using the above equation 1.

In the distance measuring device as described above, the internal reference light 4 and the reflected distance measuring light 3' are mechanically switched over by the optical path switcher 9.

Because optical path switching and light amount adjustment are both performed mechanically, it is difficult to carry out optical path switching and light amount adjustment at high speed, therefore it is difficult to perform distance measurement at high speed. For this reason, although there is no problem when distance is measured on an object to be measured such as a building, the measurement may be difficult to perform when high speed distance measurement is required, e.g. in case distance should be measured continuously on a plurality of moving objects, such as bulldozers, by using a single measuring device. Also, in case that 3-dimensional measurement is performed on an object such as building by a total station etc., surveying must be carried out on a multiple points by automatic surveying, and measurement must be performed at high speed. In case that surveying is carried out on a moving object etc., optical path switching speed and light amount adjusting speed cannot follow the moving speed of the moving object, and there are problems that distance cannot be measured in such cases.

Distance measuring device for measuring distance in multiple directions and at multiple points by rotating the distance measuring light are disclosed in the Japanese Patent Publication No. 2694647 and the Japanese Patent Publication Laid-Open 4-313013.

To solve the above problems, it is an object of the present invention to provide a distance measuring device, by which it is possible to perform optical path switching and light amount adjustment at high speed in the distance measuring device and to accomplish distance measurement at high speed.

DISCLOSURE OF THE INVENTION

The present invention provides a distance measuring device, comprising a light projecting unit for projecting a distance measuring light to an object to be measured, a reference reflection unit provided relatively movable and arranged at a known position so as to traverse the projected distance measuring light, a photodetection unit for receiving a reflection light from the object to be measured as a reflected distance measuring light and a reflection light from said reference reflection unit as an internal reference light, and a control arithmetic unit for calculating a distance to the object to be measured based on a photodetection signal relating to the reflected distance measuring light and based on a photodetection signal relating to the internal reference light. Also, the present invention provides the distance measuring device as described above, wherein there is provided a light amount adjusting means for changing a light amount of the internal reference light on an optical path where the reference reflection unit is provided. Further, the present invention provides the distance measuring device as described above, wherein the light amount adjusting means is an optical filter with density gradually changed in a direction where the distance measuring light traverses. Also, the present invention provides the distance measuring device as described above, wherein the light amount adjusting means is integrally provided with the reference reflection unit. Further, the present invention provides the distance measuring device as described above, wherein the distance measuring light scans over a measurement area including the object to be measured, and the reference reflection unit is positioned within scanning range and the reference reflection unit is arranged at a position not to interfere with a reflection light from the object to be measured. Also, the present invention provides the distance measuring device as described above, wherein the control arithmetic unit generates a plurality of internal reference standards to match a plurality of levels of photodetection light amount based on photodetection signal with changing photodetection light amount, said control arithmetic unit selects an internal reference standard to match the light amount of the reflected distance measuring light, and said control arithmetic unit calculates a distance to the object to be measured based on the selected internal reference standard and based on a photodetection signal of the reflected distance measuring light. Further, the present invention provides the distance measuring device as described above, wherein the change of the photodetection light amount is determined when the distance measuring light traverses the optical filter. Also, the present invention provides the distance measuring device as described above, wherein the reference reflection unit is supported by a moving mechanism to relatively move the reference reflection unit regarding the distance measuring light, and the moving mechanism movably supports the reference reflection unit to a position deviated from measuring direction. Further, the present invention provides the distance measuring device as described above, wherein the moving mechanism has position detecting means for detecting position of the reference reflection unit, the control arithmetic unit has error data to match the position of the reference reflection unit, and the photodetection unit corrects measurement result based on the error to match the position of the reference reflection unit when the photodetection unit receives the internal reference light. Also, the present invention provides the distance measuring device as described above, wherein the light projecting unit comprises a deflection optical member for deflecting and irradiating the distance measuring light in measuring direction, a rotating unit for supporting and rotating the deflection optical member, a reference reflection prism rotatably provided concentrically with rotation center of the rotating unit, and a rotary driving unit for rotating the reference reflection prism independently from the deflection optical member.

BEST MODE FOR CARRYING OUT THE INVENTION

Figure 1:
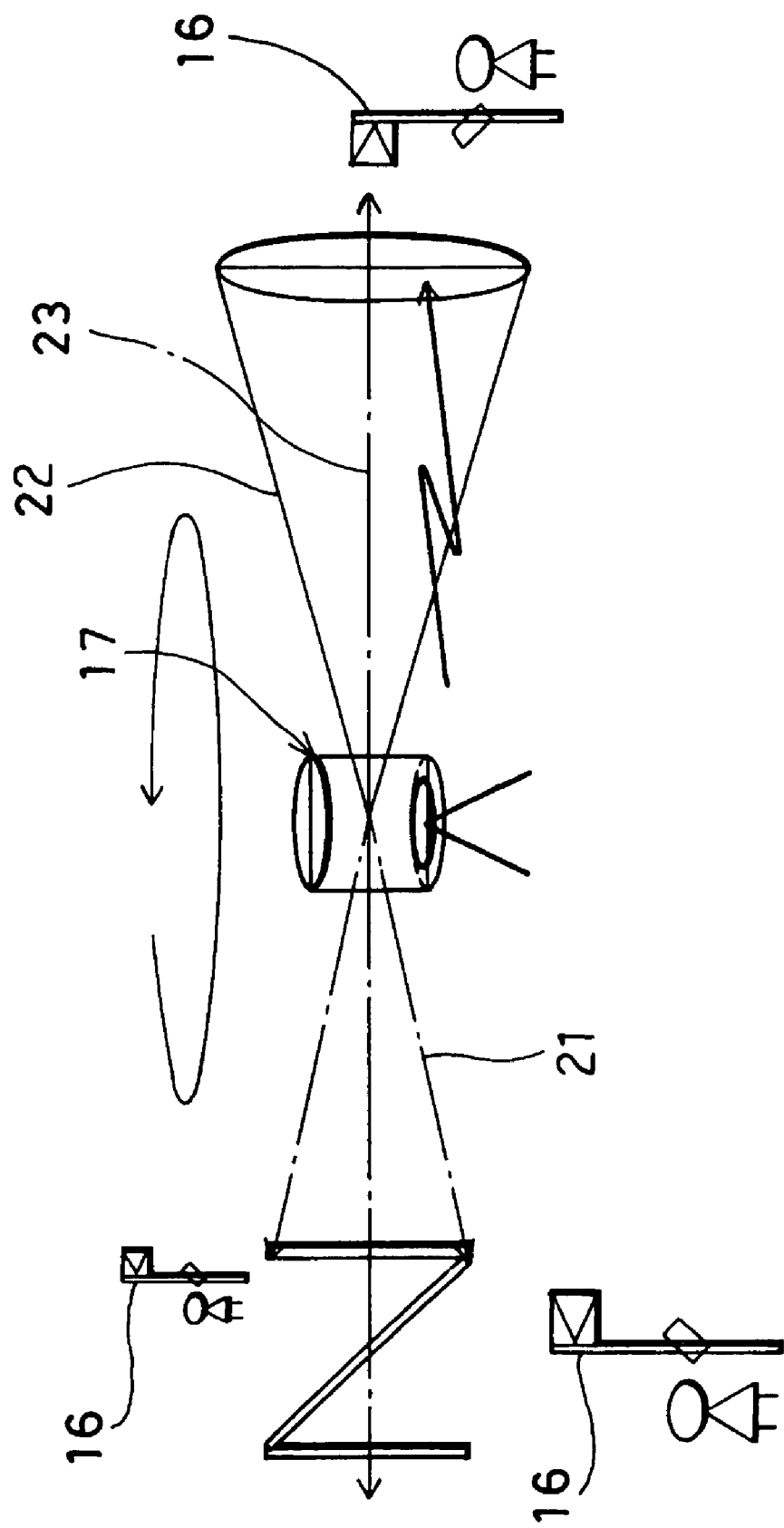
FIG. 1 is a drawing to explain general outline of an embodiment of the present invention.

Description will be given below on the best mode for carrying out the present invention referring to the drawings.

First, description will be given on general outline of measurement in the embodiment of the present invention referring to FIG. 1.

In a distance measuring device 17 shown in FIG. 1, a horizontal reference plane is formed, and a distance to an object 16 to be measured can be measured.

The distance measuring device 17 comprises a reference plane forming unit (not shown) and a distance measuring unit 19 (to be described later). The distance measuring device 17 projects a laser beam 21 for forming a reference plane by rotary irradiation, and a distance measuring light 22 can be projected by rotary irradiation. By the distance measuring light, distances to the objects 16 to be measured at a plurality of points can be measured.

The reference plane forming unit projects the laser beam 21 for forming reference plane by rotary irradiation and forms a horizontal reference plane 23. The laser beam 21 for forming the reference plane comprises a plurality of fan-shaped laser beams, at least one of which is tilted. As a laser device for projecting by rotary irradiation three or more fan-shaped laser beams, one of which is tilted, a rotary laser device is proposed in the Japanese Patent Publication Laid-Open 2004-212058.

The laser beam 21 for forming the reference plane is projected by rotary irradiation, and the object to be measured comprises a photodetector (not shown). By obtaining time difference when two or more fan-shaped laser beams are received by the photodetector, an elevation angle to the horizontal reference plane 23 around the distance measuring device 17 can be determined from the time difference and the tilting angle of the fan-shaped laser beam. Also, it is possible to set up a tilt reference plane based on the elevation angle.

Figure 2:
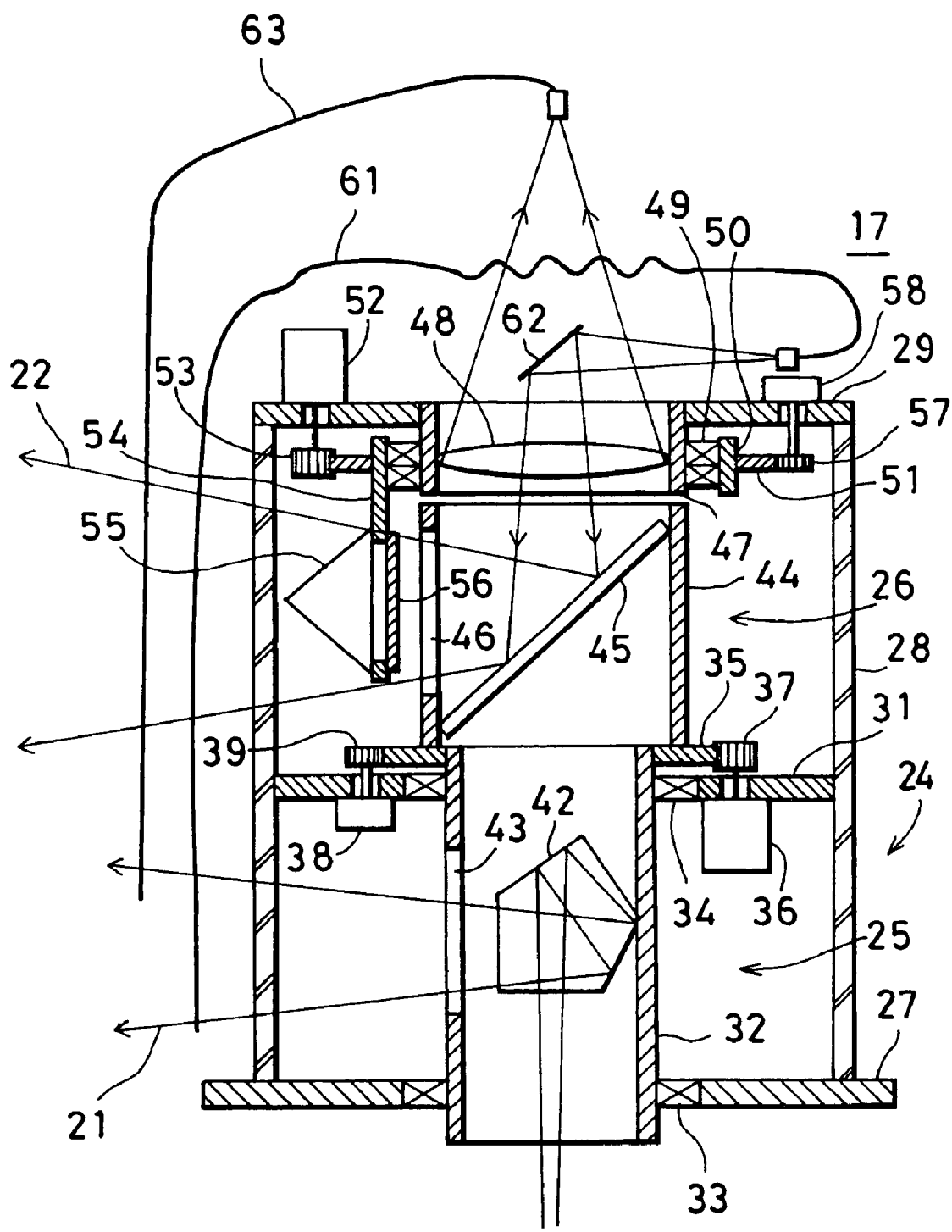
FIG. 2 is a cross-sectional view of a laser beam projecting unit of a distance measuring device according to the embodiment of the present invention.
Figure 3:
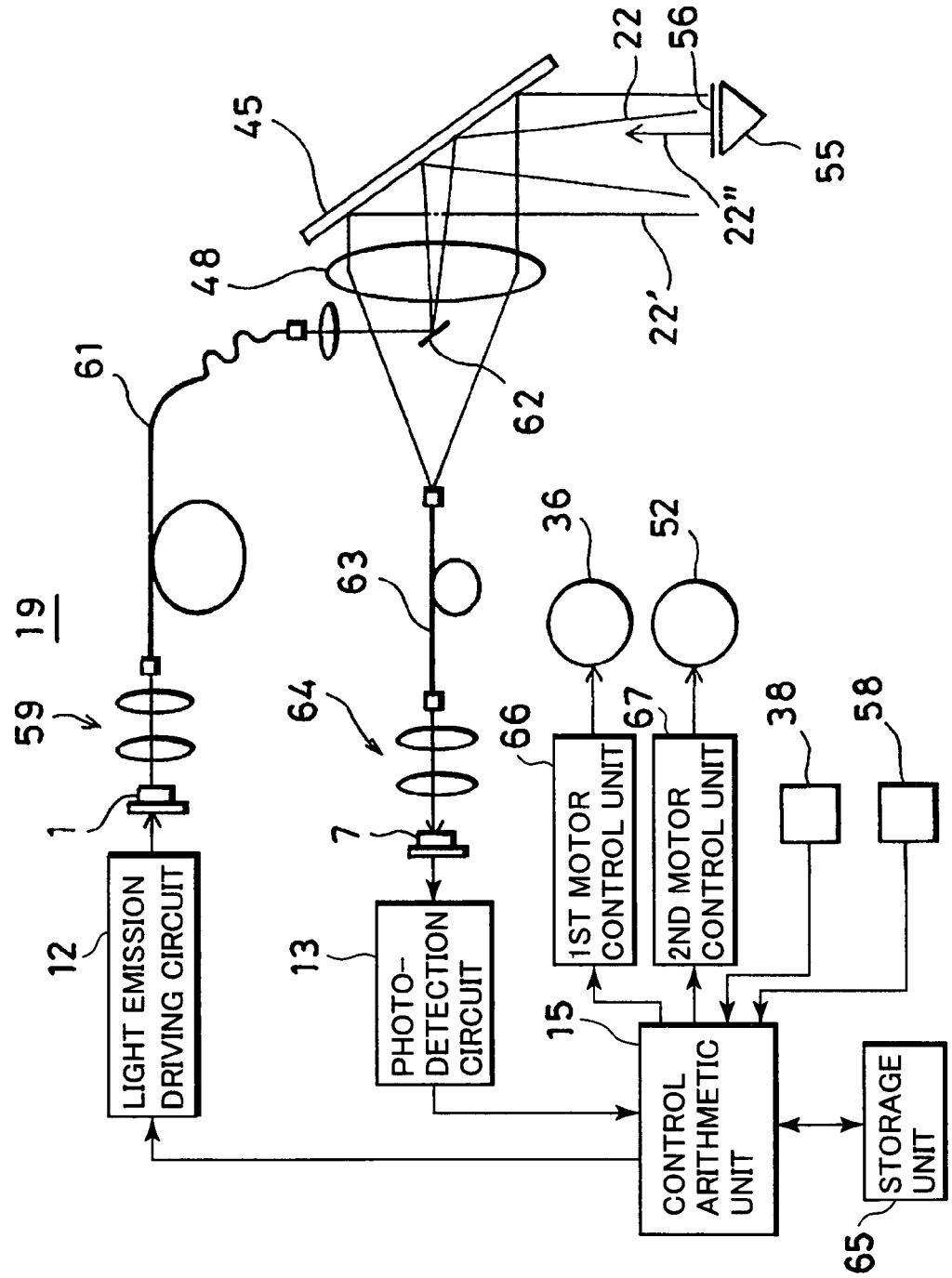
FIG. 3 is a schematical block diagram of a distance measuring unit of the distance measuring device.

FIG. 2 and FIG. 3 each represents general features of the distance measuring device according to the embodiment of the present invention. FIG. 2 shows a laser beam projecting unit 24 of the distance measuring device 17, and FIG. 3 shows general arrangement of the distance measuring unit 19 of the distance measuring device 17. The laser beam projecting unit 24 comprises a projecting unit 25 for forming a reference plane and a projecting unit 26 for measuring distance. The projecting unit 25 for forming the reference plane can irradiate the laser beam 21 for forming the reference plane, and the projecting unit 26 for measuring distance can irradiate a distance measuring light 22, independently from each other. In the present embodiment, projecting direction of the laser beam 21 for forming the reference plane is the same as projecting direction of the distance measuring light 22. However, projecting directions may not be necessarily the same. For instance, the projecting directions of these laser beams may differ by 180°.

In FIG. 2, reference numeral 27 denotes a ceiling of a housing of the distance measuring device 17. Within the housing, a laser light source unit (not shown) for forming the reference plane is accommodated. On upper side of the ceiling 27, a projection window 28 in cylindrical shape is arranged. The projection window 28 is made of a material such as transparent glass, and the projection window 28 is provided to be concentric with optical axis of the projecting unit 25 for forming the reference plane. On an upper end of the projection window 28, an upper base plate 29 is provided, and an intermediate base plate 31 is provided inside of the projection window 28.

A prism holder 32 in cylindrical shape is provided concentrically with optical axis of the projecting unit 25 for forming the reference plane. The prism holder 32 is rotatably supported on the ceiling 27 and on the intermediate base plane 31 via bearings 33 and 34.

Inside the prism holder 32, a pentagonal prism 42 is provided as a deflection optical member. A first projection hole 43 is formed on a part of the prism holder 32 facing to the pentagonal prism 42. The laser beam 21 for forming the reference plane projected from the laser light source unit for forming the reference plane is deflected in horizontal direction by the pentagonal prism 42, and the laser beam 21 for forming the reference plane is projected through the first projection hole 43.

On an upper end of the prism holder 32, a first rotary gear 35 is provided. A first rotating motor 36 is mounted on the intermediate base plate 31. A first driving gear 37 is engaged with output shaft of the first rotating motor 36 and the first driving gear 37 is geared with the first rotary gear 35. By driving the first rotating motor 36, the pentagonal prism 42 is rotated via the first driving gear 37 and the first rotary gear 35, and the laser beam 21 for forming the reference plane is rotated within a horizontal plane.

A first encoder 38 is mounted on the intermediate base plate 31. A first driven gear 39 is engaged with input shaft of the first encoder 38 and the first driven gear 39 is geared with the first rotary gear 35. Rotation angle of the first rotary gear 35 is detected by the first encoder 38, and then projecting direction of the laser beam 21 for forming the reference plane is detected.

A mirror holder 44 is provided on upper side of the prism holder 32 concentrically with the prism holder 32. On the mirror holder 44, a reflection mirror 45 is held as a deflection optical member, and a second projection hole 46 is provided on a part facing to reflection surface of the reflection mirror 45. The mirror holder 44 is integrated with the prism holder 32, and the pentagonal prism 42 and the reflection mirror 45 have the same optical axis and are rotated integrally. When the pentagonal prism 42 and the reflection mirror 45 are rotated on the same optical axis, these may not be necessarily integrated with each other.

A body tube 47 is provided on the upper base plate 29. The center of the body tube 47 is aligned with the center of the mirror holder 44, and a condenser lens 48 is held by the body tube 47. A rotary ring 50 is rotatably provided on the body tube 47 via a bearing 49, and a second rotary gear 51 is engaged with the rotary ring 50.

A second rotating motor 52 is provided on the upper base plate 29. A second driving gear 53 is engaged with output shaft of the second rotating motor 52, and the second driving gear 53 is geared with the second rotary gear 51.

A reflection prism holding member 54 is fixed on the rotary ring 50, and a reference reflection prism 55 for internal light optical path is fixed on the reflection prism holding member 54 as a reference reflection unit. On the internal light optical path, e.g. on reflection surface of the reference reflection prism 55, an amplitude filter 56 is provided. The amplitude filter 56 is so designed that density is continuously changed in horizontal direction, and transmitting light amount of the laser beam is continuously decreased or continuously increased. The amplitude filter 56 may be so designed that density is changed stepwise so far as density is substantially and gradually changed in rotating and scanning direction.

More concretely, the reference reflection prism 55 may be designed as a corner cube, and a filter may be attached on the corner cube. The filter is designed such manner that transmissivity on or around the center is high and transmissivity is decreased more toward the periphery.

A second encoder 58 is mounted on the upper base plate 29, and a second driven gear 57 is engaged with input shaft of the second encoder 58. The second driven gear 57 is engaged with the second rotary gear 51.

When the second rotating motor 52 is driven, the reference reflection prism 55 is rotated integrally with the amplitude filter 56 via the second driving gear 53, the second rotary gear 51 and the rotary ring 50. Rotation angle of the rotary ring 50 is detected by the second encoder 58 via the second rotary gear 51 and the second driven gear 57.

On optical axis of the condenser lens 48, a deflection mirror 62 is arranged. Exit end of an optical fiber 61 for projection is positioned to face opposite to the reflection surface of the deflection mirror 62. On optical axis of the condenser lens 48, incident end of the optical fiber 63 for photodetection is positioned.

The optical fiber 61 for projection guides the distance measuring light 22 emitted by a light emitting element 1 toward the deflection mirror 62, and the optical fiber 63 for photodetection guides the reflected distance measuring light 22' and the internal reference light 22" toward the photodetection element 7.

Now, description will be given on the distance measuring unit 19 referring to FIG. 3.

Figure 7:
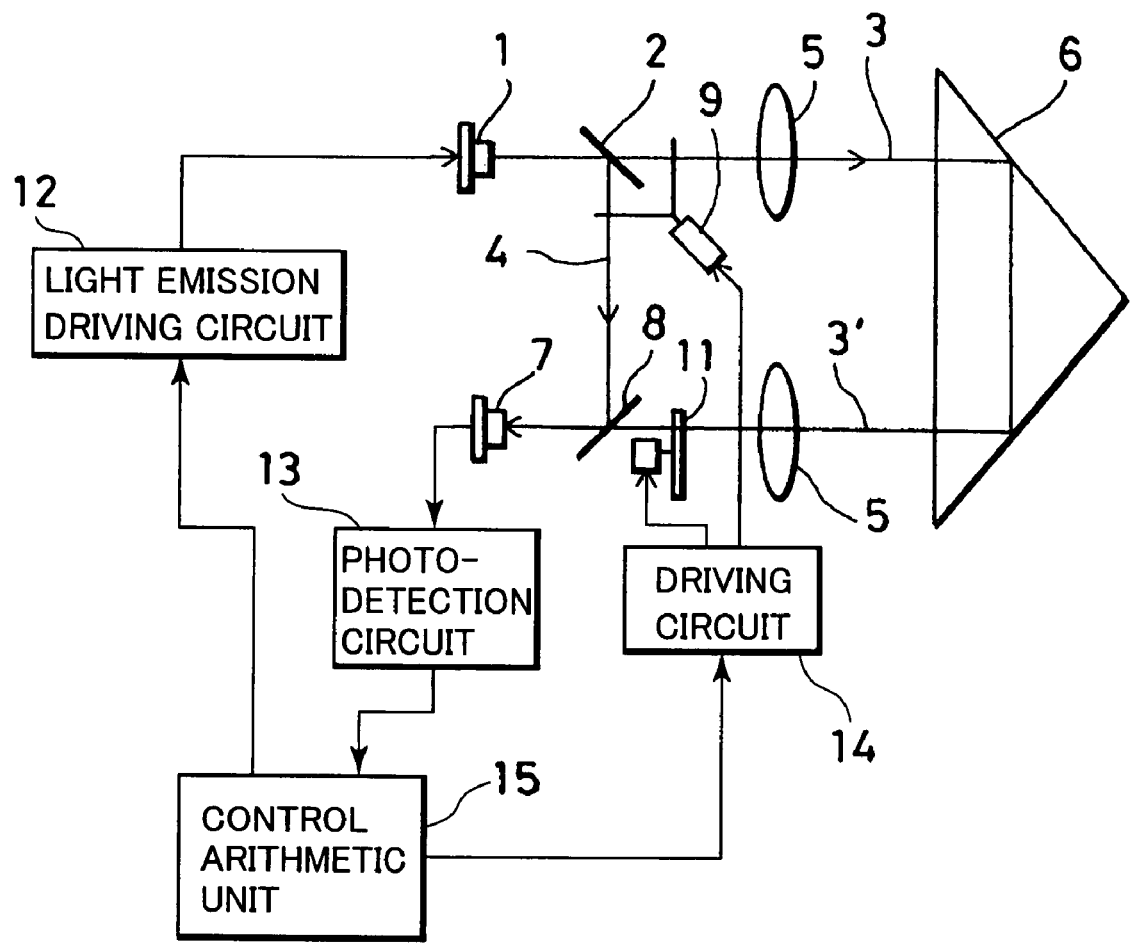
FIG. 7 is a block diagram of a conventional type distance measuring device.

In FIG. 3, the same component as shown in FIG. 7 is referred by the same symbol.

A condenser lens 59 is arranged on exit optical axis of the light emitting element 1, and an incident end of the optical fiber 61 for projection is arranged on light converging position of the condenser lens 59. As described above, the optical fiber 61 for projection guides the distance measuring light 22 toward the deflection mirror 62.

An incident end of the optical fiber 63 for photodetection is arranged at light converging position of the condenser lens 48, and an exit end of the optical fiber 63 for photodetection is arranged on optical axis of the condenser lens 64. The reflected distance measuring light 22' and the internal reference light 22" projected from the optical fiber 63 for photodetection are converged to the photodetection element 7 by the condenser lens 64.

A light emission driving circuit 12 controls driving light emission of the light emitting element 1 based on a control signal from a control arithmetic unit 15. A photodetection circuit 13 performs processing such as amplifying, A/D conversion, etc. on a photodetection signal from the photodetection element 7. The signal thus processed is sent out to the control arithmetic unit 15.

The control arithmetic unit 15 comprises a storage unit 65. In the storage unit 65, programs are stored, such as a distance measuring and calculating program for calculation of distance measurement, and a sequence program for executing the measurement. In the storage unit 65, the change of light amount over time and the data during measurement, etc. of the photodetection signal from the photodetection element 7 are stored.

According to the sequence program, the control arithmetic unit 15 issues control signals to a first motor control unit 66 for the first rotating motor 36 and to a second motor control unit 67 for the second rotating motor 52. The first motor control unit 66 controls rotation and stopping of the first rotating motor 36, and the second motor control unit 67 controls rotation and stopping of the second rotating motor 52.

The first encoder 38 detects a rotation angle of the mirror holder 44 and sends out the result to the control arithmetic unit 15. The second encoder 58 detects a rotation angle of the reference reflection prism 55 and inputs it to the control arithmetic unit 15.

Now, description will be given on operation of the measurement.

By the light emission driving circuit 12, the light emitting element 1 emits and is modulated at a predetermined frequency and irradiates a laser beam for distance measurement. The laser beam from the light emitting element 1 is converged to an incident end of the optical fiber 61 for projection by the condenser lens 59. Being guided by the optical fiber 61 for projection, the laser beam is projected as the distance measuring light 22 from the exit end. The distance measuring light 22 is reflected on optical axis of the condenser lens 48 by the deflection mirror 62. Further, the laser beam guided by the optical fiber 61 for projection is converged by the condenser lens 48 and enters the reflection mirror 45, deflected by the reflection mirror 45 and is projected in horizontal direction as a required spreading angle is given by the projection window 28.

Under the condition where the distance measuring light 22 is projected and the laser beam 21 for forming reference plane is projected, the first rotating motor 36 is driven. The pentagonal prism 42 and the reflection mirror 45 are rotated via the first driving gear 37 and the first rotary gear 35. Through the projection window 28, the laser beam 21 for forming reference plane and the distance measuring light 22 are projected by rotary irradiation. Or, the laser beam 21 for forming reference plane and the distance measuring light 22 are projected by rotary scanning over a measurement area where at least the objects to be measured are present.

Under the conditions where distance measurement is performed, i.e. the distance measuring light 22 is projected, the reference reflection prism 55 is rotated by the second rotating motor 52. The reference reflection prism 55 is deviated from the direction of the object to be measured, i.e. deviated from the distance measuring direction. The second rotating motor 52 is stopped and the reference reflection prism 55 is held at a position not to exert influence on the measurement.

In case there are a plurality of the objects to be measured and the reference reflection prism 55 is to be an obstacle, the reference reflection prism 55 is held at a certain fixed position, it may be designed such manner that the reference reflection prism 55 is rotated in response to the rotation of the reflection mirror 45 and that overlapping of the measuring direction with the position of the reference reflection prism 55 can be avoided. Specifically, the direction where the object to be measured is present can be detected by the first encoder 38. In this respect, the position of the object to be measured is determined in advance by rotary scanning. Based on the result of detection from the second encoder 58, the reference reflection prism 55 can be moved to a position deviated from the measuring direction.

When the distance measuring light 22 is projected by rotary irradiation and the distance measuring light 22 traverses the object to be measured, the distance measuring light 22 is reflected by the object to be measured. Being reflected by the object to be measured, the distance measuring light 22' enters the reflection mirror 45 and is reflected by the reflection mirror. Then, the distance measuring light 22' is converged by the condenser lens 48 and enters incident end surface of the optical fiber 63 for photodetection. The reflected distance measuring light 22' projected from the optical fiber 63 for photodetection is converged by the condenser lens 64 and is received by the photodetection element 7. A photodetection signal from the photodetection element 7 is sent out to the control arithmetic unit 15 after processing such as amplifying and A/D conversion and is stored in the storage unit 65 via the control arithmetic unit 15.

When the distance measuring light 22 is projected by rotary irradiation, the distance measuring light 22 also traverses the reference reflection prism 55. The distance measuring light 22 is reflected by the reference reflection prism 55 during process of the reference reflection prism 55, and the reflected laser beam is further reflected by the reflection mirror 45. After passing through the condenser lens 48 and the optical fiber 63 for photodetection, the distance measuring light 22 is received by the photodetection element 7 as an internal reference light 22".

In this case, an internal reference light optical path is formed by an optical path to the photodetection element 7, which passes through the optical fiber 61 for projection, the reflection mirror 45, the reference reflection prism 55, the reflection mirror 45, and the optical fiber 63 for photodetection. Also, the length of this internal reference light optical path is already known as a design value or a measured value.

The photodetection signal from the photodetection element 7 is inputted to the photodetection circuit 13. The photodetection circuit 13 performs processing such as amplifying and A/D conversion on the photodetection signals of the reflected distance measuring light 22' and the internal reference light 22". The processed signals are sent out to the control arithmetic unit 15 and are stored in the storage unit 65 by the control arithmetic unit 15. By the distance measurement calculating program stored in the storage unit 65, the control arithmetic unit 15 calculates phase difference between the reflected distance measuring light 22' and the internal reference light 22" based on the photodetection signal stored in the storage unit 65. Then, a distance to the object to be measured is calculated from the phase difference and light velocity.

Next, description will be given on the reflected distance measuring light 22' and the internal reference light 22" referring to FIG. 4 (A) and FIG. 4 (B).

As described above, according to the present invention, distance is measured by projecting the distance measuring light 22 by rotary irradiation or through reciprocal scanning by the distance measuring light 22 over a predetermined range. For instance, in case that the distance measuring light 22 is projected by rotary irradiation, and if there is only one object to be measured, the photodetection element 7 receives one reflected distance measuring light 22' and one internal reference light 22" from the object to be measured as the reflection mirror 45 is rotated by one turn, e.g. the distance measuring light 22 is rotated by one turn.

As described above, the amplitude filter 56 is provided on the reflection surface of the reference reflection prism 55. In process that the distance measuring light 22 traverses the reference reflection prism 55 in horizontal direction, the distance measuring light 22 traverses the amplitude filter 56 in the same manner. In the amplitude filter 56, density is gradually changed in horizontal direction, and light amount of the internal reference light 22" transmitting the amplitude filter 56 is gradually changed. The amount of the light amount change of the internal reference light 22" is set in such manner that it is equal to or more than the change of the light amount of the reflected distance measuring light 22' from the object to be measured at near distance and the light amount of the reflected distance measuring light 22' from the object to be measured at long distance. More concretely, the light amount change of the internal reference light 22" should be set to the maximum value in the dynamic range of the photodetection unit or within the dynamic range.

Figure 4A:
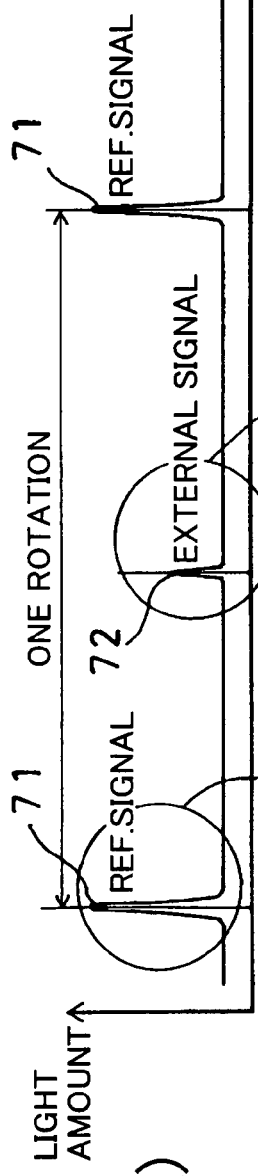
FIG. 4 (A) is a diagram to show photodetecting condition of a photodetection element, and FIG. 4 (B) is an enlarged diagram of a photodetection signal.
Figure 4B:
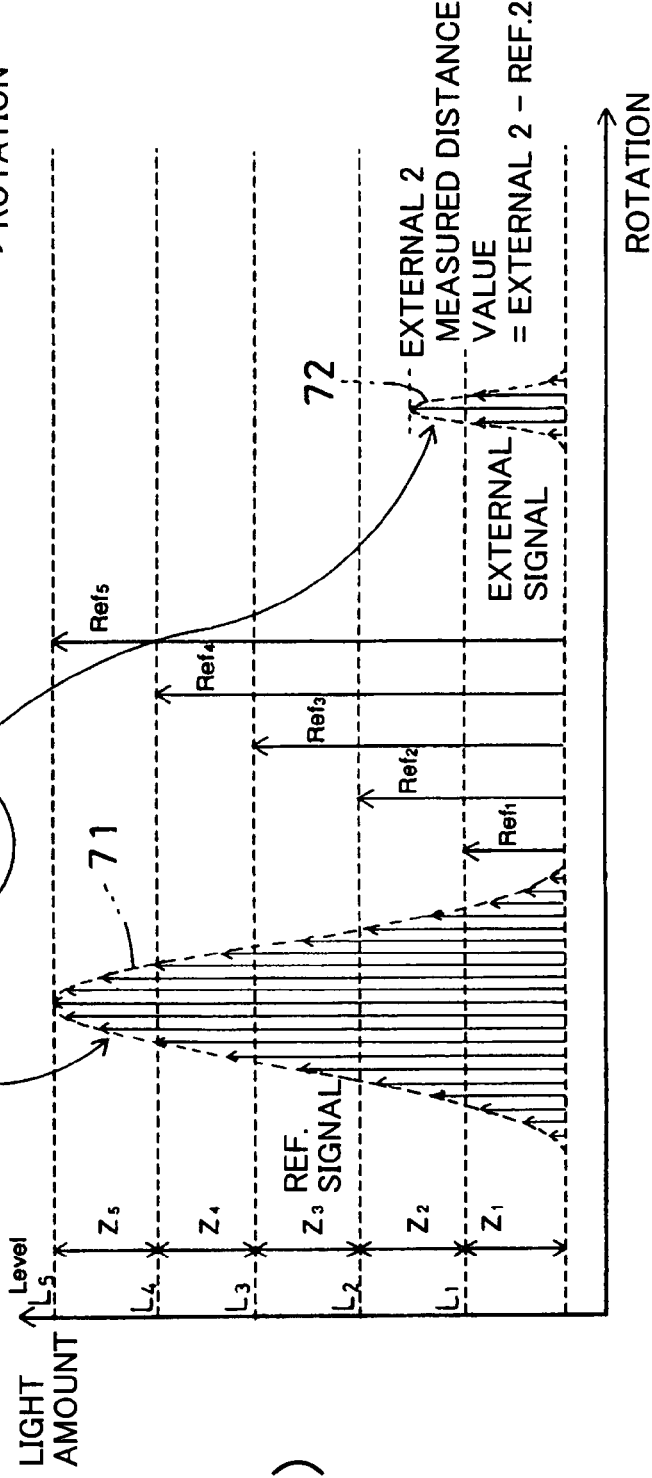

FIG. 4 (A) and FIG. 4 (B) each represents a photodetection signal of the photodetection element 7. In the figures, reference numeral 71 denotes a reference signal obtained when the internal reference light 22" is received, and numeral 72 denotes a distance measuring signal (external signal) obtained when the reflected distance measuring light 22' is received.

The reference signal 71 is divided to levels of predetermined steps. For instance, as shown in FIG. 4 (B), the reference signal 71 is divided to levels of 5-step levels of L1, L2, L3, L4 and L5, and the reference signal 71 is divided to 5 zones of Z1, Z2, Z3, Z4 and Z5 to match the levels of L1, L2, L3, L4 and L5.

Among the reference signals 71, a photodetection signal of a portion with a light amount to match the level 1 is extracted as a Ref. 1 internal reference light. Also, a photodetection signal of a portion with a light amount to match the level 2 is extracted as a Ref. 2 internal reference light, a photodetection signal of a portion with a light amount to match the level 3 is extracted as a Ref. 3 internal reference light, a photodetection signal of a portion with a light amount to match the level 4 is extracted as a Ref. 4 internal reference light, and a photodetection signal of a portion with a light amount to match the level 5 is extracted as a Ref. 5 internal reference light, and these are stored in the storage unit 65.

The control arithmetic unit 15 calculates photodetection light amount of the reflected distance measuring light 22' from the photodetection signal sent out from the photodetection element 7, and selects a Ref. internal reference light to match the light amount of the reflected distance measuring light 22' from a plurality of the Ref. internal reference lights (5 lights are shown in FIG. 4) stored in the storage unit 65.

For instance, in case that the photodetection light amount of the reflected distance measuring light 22' is higher than the level L1 and lower than the level L2 and belongs to the zone Z2, the photodetection signal of the Ref. 2 internal reference light is selected as the Ref. internal reference light. Based on the photodetection signal of the Ref. 2 internal reference light and on the distance measuring signal 72, phase difference is calculated, and a distance is calculated from the phase difference and light velocity.

Photodetection light amount of the photodetection signal of the Ref. 2 internal reference light is equal or approximately equal to light amount of the photodetection signal of the distance measuring signal 72. Thus, no measurement error occurs due to the difference of the photodetection light amount between the reference light and the distance measuring light.

Further, the Ref. internal reference light with a light amount to match the reflected distance measuring light 22' is selected by signal processing to the data recorded in the storage unit 65. Therefore, no mechanical operation is needed, e.g. switchover of optical path between the internal reference light and the distance measuring light, and light amount adjustment by the density filter. As a result, distance measurement can be executed at very high speed.

It is possible to measure high speed such as distance measurement by a distance measuring light projected by rotary irradiation. On the side of the object to be measured, a distance data and an angle data are measured based on an angle signal from the first encoder 38. Further, an elevation angle is determined by the laser beam for forming reference plane, and the position of the object to be measured can be detected.

As described above, according to the present invention, the internal reference light 22" is obtained by reflection at the reference reflection prism 55 which rotates. For this reason, the rotating mechanism for supporting the reference reflection prism 55 may induce error caused by component accuracy, assembling accuracy, etc.

Figures 5, 6:
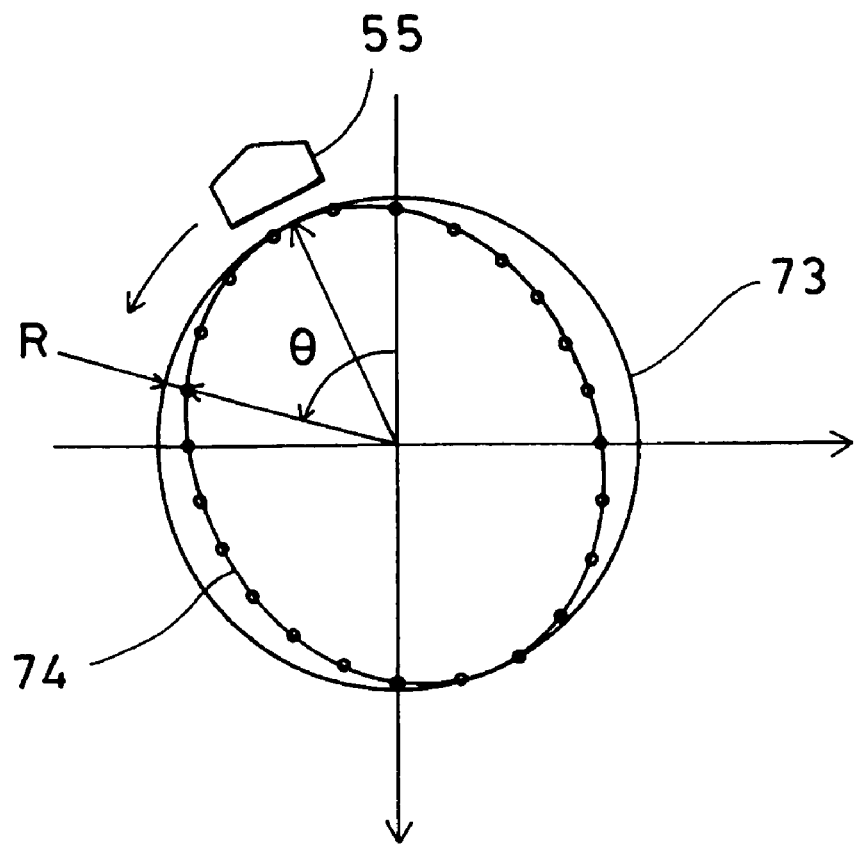
FIG. 5 is a drawing to explain an error when a reference reflection prism is rotated in the distance measuring device.
FIG. 6 is a table showing data about errors and rotation angles when the reference reflection prism is rotated.

FIG. 5 schematically shows error caused by change of rotating position of the reference reflection prism 55.

In the figure, reference numeral 73 denotes a standard locus of the reflection surface of the reference reflection prism 55 when the reference reflection prism 55 is rotated in case that it is supposed that the rotating mechanism has no error, and the standard locus is turned to a true circle. Also, in the figure, reference numeral 74 denotes a locus of the reflection surface of the reference reflection prism 55 when the rotating mechanism has an error. A difference between the standard locus 73 and the locus 74 appear as an error R. In the figure, the locus 74 is shown as an ellipse for convenience.

The error R appears as an error of the length of the internal reference light optical path, and the error R is turned to a measurement error. In case the measurement with high accuracy is carried out, the measurement result must be corrected according to the error R.

Also, the value of the locus 74 is determined by predetermined means, e.g. by actual measurement. The data is obtained through matching of the rotating position θ of the reference reflection prism 55 and the error R of the reflection surface of the reference reflection prism 55. The rotating position θ is measured by the second encoder 58. For instance, errors are measured at every 15° step, and a data table as shown in FIG. 6 is prepared, and the data table is stored in the storage unit 65.

The rotating position of the reference reflection prism 55 when the reference signal 71 (see FIG. 4) is obtained is detected from an angle signal of the second encoder 58. The error R to match the detected angle is acquired from the data table, and the calculated measured distance is corrected based on the error R. The error R may be obtained by judging the rotating position by zone, e.g. it may be set as R1 for the angles 0° to 15°, or as R2 for the angles 15° to 30°. Also, for instance, the error R of the rotating position between the angles 0° to 15° may be determined by dividing proportionally the values of R1 and R2.

In the embodiment as described above, it may be designed in such manner that projecting direction of the distance measuring light 22 is fixed and the reference reflection prism 55 may be rotated to traverse the distance measuring light 22 by driving the second rotating motor 52.

In case that there is only one object to be measured, the function to project the distance measuring light 22 by rotary irradiation may be omitted and only the reference reflection prism 55 is rotated, or the reference reflection prism 55 may be moved by sliding to traverse the distance measuring light 22. The distance measuring mode may be phase difference mode or may be time difference mode.

INDUSTRIAL APPLICABILITY

According to the present invention, a distance measuring device is provided, which comprises a light projecting unit for projecting a distance measuring light to an object to be measured, a reference reflection unit provided relatively movable and arranged at a known position so as to traverse the projected distance measuring light, a photodetection unit for receiving a reflection light from the object to be measured as a reflected distance measuring light and a reflection light from the reference reflection unit as an internal reference light, and a control arithmetic unit for calculating a distance to the object to be measured based on a photodetection signal relating to the reflected distance measuring light and based on a photodetection signal relating to the internal reference light. Because no mechanical optical path switchover is needed between the distance measuring light and the internal reference light, distance can be measured at high speed.

The present invention provides the distance measuring device as described above, wherein there is provided a light amount adjusting means for changing a light amount of the internal reference light on an optical path where the reference reflection unit is provided. As a result, it is possible to obtain the internal reference light to match the light amount of the reflected distance measuring light, and this contributes to the improvement of reliability of measurement.

Also, the present invention provides the distance measuring device as described above, wherein the distance measuring light scans over a measurement area including the object to be measured, and the reference reflection unit is positioned within scanning range and the reference reflection unit is arranged at a position not to interfere with a reflection light from the object to be measured. As a result, distance can be measured in the process of scanning of the distance measuring light, and this contributes to the execution of high speed distance measurement.

Further, the present invention provides the distance measuring device as described above, wherein the control arithmetic unit generates a plurality of internal reference standards to match a plurality of levels of photodetection light amount based on photodetection signal with changing photodetection light amount, said control arithmetic unit selects an internal reference standard to match the light amount of the reflected distance measuring light, and said control arithmetic unit calculates a distance to the object to be measured based on the selected internal reference standard and based on a photodetection signal of the reflected distance measuring light. Thus, the photodetection light amount can be adjusted—not by mechanical means but only by signal processing. This contributes to the execution of high speed measurement, and a distance to the object to be measured can be determined at real time during the scanning of the distance measuring light.

Also, the present invention provides the distance measuring device as described above, wherein the reference reflection unit is supported by a moving mechanism to relatively move the reference reflection unit toward the distance measuring light, and the moving mechanism movably supports the reference reflection unit to a position deviated from measuring direction. Thus, the presence of the reference reflection unit does not cause hindrance for the measuring operation.

Further, the present invention provides the distance measuring device as described above, wherein the moving mechanism has position detecting means for detecting position of the reference reflection unit, the control arithmetic unit has error data to match the position of the reference reflection unit, and the photodetection unit corrects measurement result based on the error to match the position of the reference reflection unit when the photodetection unit receives the internal reference light. Therefore, the measurement with high accuracy can be achieved.

What is claimed is:

1. A distance measuring device, comprising a light projecting unit for rotating and projecting a distance measuring light to a measurement area including an object to be measured, a reference reflection unit provided relatively movable and arranged at a known position within a scanning range so as to traverse the projected distance measuring light rotated and projected to the measurement area, a moving mechanism for supporting said reference reflection unit so that said reference reflection unit moves relative to the distance measuring light, and for movably supporting said reference reflection unit to a position deviated from a measuring direction, a photodetection unit for receiving a reflection light from the object to be measured as a reflected distance measuring light and a reflection light from said reference reflection unit as an internal reference light, and a control arithmetic unit for calculating a distance to the object to be measured based on a photodetection signal relating to the reflected distance measuring light and based on a photodetection signal relating to the internal reference light.

2. A distance measuring device according to claim 1, wherein there is provided a light amount adjusting means for changing a light amount of the internal reference light on an optical path where said reference unit is provided.

3. A distance measuring device according to claim 2, wherein said light amount adjusting means is an optical filter with density gradually changed in a direction where the distance measuring light traverses.

4. A distance measuring device according to claim 2 or 3, wherein said light amount adjusting means is integrally provided with said reference reflection unit.

5. A distance measuring device according to claim 1, wherein the distance measuring light scans over at least a measurement area including the object to be measured, and said reference reflection unit is arranged at a position not to interfere with a reflection light from the object to be measured.

6. A distance measuring device according to claim 2, wherein said control arithmetic unit generates a plurality of internal reference standards to match a plurality of levels of photodetection light amount based on photodetection signal with changing photodetection light amount, said control arithmetic unit selects an internal reference standard to match the light amount of the reflected distance measuring light, and said control arithmetic unit calculates a distance to the object to be measured based on the selected internal reference standard and based on a photodetection signal of the reflected distance measuring light.

7. A distance measuring device according to claim 3, wherein the change of the photodetection light amount is obtained when the distance measuring light traverses the optical filter.

8. A distance measuring device according to claim 1, wherein said moving mechanism has a position detecting means for detecting position of said reference reflection unit, said control arithmetic unit has error data to match the position of said reference reflection unit, and the measurement result is corrected based on the error to match the position of said reference reflection unit when said photodetection unit receives the internal reference light.

9. A distance measuring device according to claim 1, wherein said light projecting unit comprises a deflection optical member for deflecting and irradiating the distance measuring light in measuring direction, a rotating unit for supporting and rotating said deflection optical member, a reference reflection prism rotatably provided concentrically with rotation center of said rotating unit, and a rotary drive unit for rotating said reference reflection prism independently from said deflection optical member.

* * * * *